United States Patent
Rachoori et al.

(10) Patent No.: US 11,606,587 B2
(45) Date of Patent: Mar. 14, 2023

(54) EMBEDDABLE MEDIA PLAYBACK INTERACTION SHARING

(71) Applicant: DISH Network Technologies India Private Limited, Bengaluru (IN)

(72) Inventors: Sandeep Rachoori, Mahadevpura (IN); Prudvi Raj Daniyala, Munnekolala Marthahalli (IN)

(73) Assignee: DISH NETWORK TECHNOLOGIES INDIA PRIVATE LIMITED, Bengaluru (IN)

( * ) Notice: Subject to any disclaimer, the term of this patent is extended or adjusted under 35 U.S.C. 154(b) by 0 days.

(21) Appl. No.: 17/092,877

(22) Filed: Nov. 9, 2020

(65) Prior Publication Data
US 2022/0078497 A1 Mar. 10, 2022

(30) Foreign Application Priority Data
Sep. 4, 2020 (IN) .............................. 202041038200

(51) Int. Cl.
| | |
|---|---|
| *H04N 7/10* | (2006.01) |
| *H04N 21/2389* | (2011.01) |
| *H04N 21/8545* | (2011.01) |
| *H04N 21/84* | (2011.01) |
| *H04N 21/845* | (2011.01) |

(52) U.S. Cl.
CPC ....... *H04N 21/23892* (2013.01); *H04N 21/84* (2013.01); *H04N 21/8456* (2013.01); *H04N 21/8545* (2013.01)

(58) Field of Classification Search
CPC ............ H04N 21/23892; H04N 21/84; H04N 21/8456; H04N 21/8545
See application file for complete search history.

(56) References Cited

U.S. PATENT DOCUMENTS

| | | | | |
|---|---|---|---|---|
| 6,052,738 | A * | 4/2000 | Muller ................ | G06F 13/1689 709/213 |
| 6,304,283 | B1 * | 10/2001 | Kitagawa ............. | H04N 5/9201 348/E7.083 |
| 9,152,603 | B1 * | 10/2015 | Kelly, III .......... | G06F 15/17331 |
| 2008/0209021 | A1 * | 8/2008 | Shamma ............... | H04L 51/046 709/223 |
| 2008/0209075 | A1 * | 8/2008 | Shamma .................. | H04L 9/40 709/248 |

(Continued)

*Primary Examiner* — Annan Q Shang
(74) *Attorney, Agent, or Firm* — Kilpatrick Townsend & Stockton LLP

(57) ABSTRACT

Techniques are described for integrated sharing of media playback interactions (MPIs). Responsive to consumer interactions with media content during playback of a media file, embodiments can produce MPIs corresponding to the consumer's changes in the playback presentation of the content. The MPIs can be associated with the media file as one or more sharable embedded MPIs (EMPIs). A consumer can share the media file with its associated EMPIs. When the same or a different consumer subsequently accesses the content from the media file, embodiments permit playback of the content with selective access to the EMPIs. For example, a first consumer can share media content with its associated EMPIs, thereby permitting a second consumer control over which portions of the media content are played back with and without experiencing the first consumer's EMPIs.

20 Claims, 7 Drawing Sheets

(56) References Cited

U.S. PATENT DOCUMENTS

| | | | |
|---|---|---|---|
| 2011/0109648 A1* | 5/2011 | Roberts | H04N 21/8405 345/629 |
| 2011/0126252 A1* | 5/2011 | Roberts | H04N 21/435 725/114 |
| 2011/0138326 A1* | 6/2011 | Roberts | H04N 21/812 715/808 |
| 2013/0013699 A1* | 1/2013 | Huxley | H04L 12/185 709/204 |
| 2017/0070758 A1* | 3/2017 | Phillips | H04N 21/8456 |
| 2019/0155465 A1* | 5/2019 | Maxwell | G06F 3/0484 |

* cited by examiner

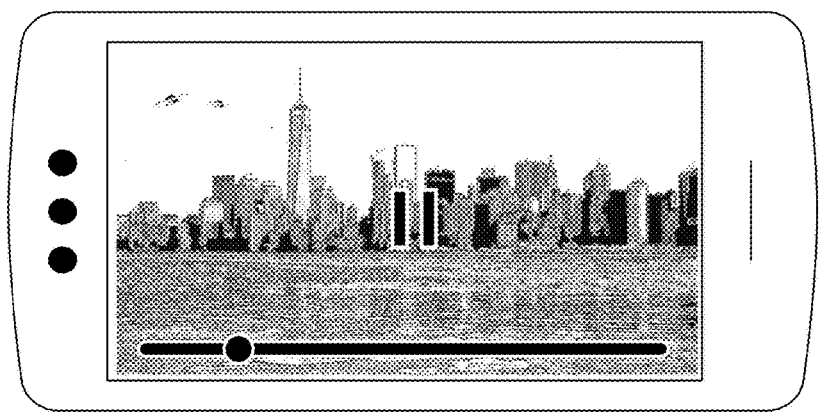
FIG. 3A
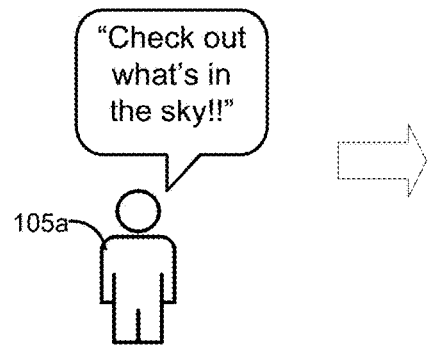 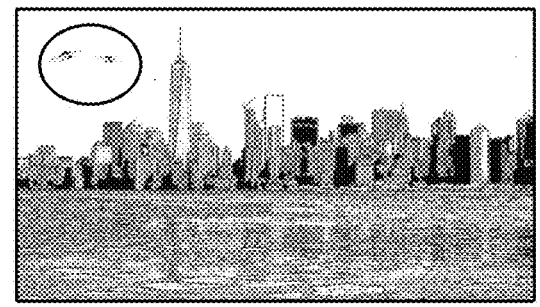
FIG. 3B      FIG. 3C
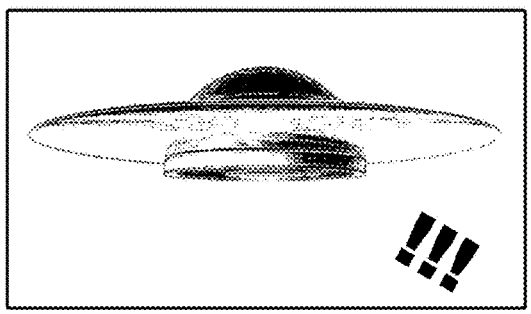 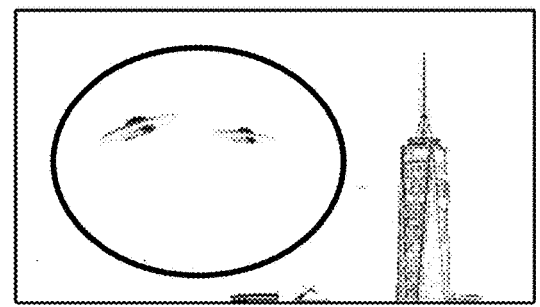
FIG. 3E      FIG. 3D

EMBEDDABLE MEDIA PLAYBACK INTERACTION SHARING

CROSS-REFERENCE TO RELATED APPLICATIONS

This application claims priority to Indian Provisional Application No. 202041038200, filed on Sep. 4, 2020, entitled "Embeddable Media Playback Interaction Sharing," the disclosure of which is hereby incorporated by reference in its entirety for all purposes.

FIELD

This invention relates generally to media interactivity, and, more particularly, to generation, sharing, and presentation of embeddable media playback interactions.

BACKGROUND

Individuals have more access to different types of media now than ever before. Stored and streaming video content can be accessed by users around the world on a variety of mobile playback devices, such as smart phones and tablet computers. Many such devices provide various types of interaction features with which consumers can adjust and enhance their media consumption experiences in real time. For example, various graphical media player interfaces, touchscreen interfaces, and the like, allow users to navigate playback of media (e.g., by pausing, rewinding, jumping to a particular playback location, etc.), annotate media (e.g., by adding text, images, highlighting, voice-over content, etc.), adjust the media itself (e.g., by adjusting zoom, rotation, cropping, coloring, brightness, contrast, etc.; applying filters; etc.), etc. While these various features can enhance a consumer's own consumption experience during playback, conventional approaches tend not to facilitate sharing of such experiences in a manner that integrates with the original media.

Suppose, during playback of a video clip, a first consumer is excited to notice a particular item of interest in the background. The first consumer pauses the playback, zooms in on the background item, draws a red circle around the item on his screen, and writes on the screen in bold letters "Wow! Check this out!" To share that consumption experience with a second consumer at a different time (or even for his own subsequent viewing), conventional approaches tend to rely on the first consumer first generating a separate media file that is a recording of his experience and his interactions, and sharing that separate media file with the second consumer. With such an approach, the second consumer must choose which video file to view: The original video file provides an unannotated viewing experience, but does not provide any access to the first consumer's interaction experience; and the separate media file provides a viewing experience completely matching the first consumer's interaction experience, but does not provide an unannotated, original viewing experience.

SUMMARY

Among other things, embodiments provide novel systems and methods for generation, sharing, and presentation of embeddable media playback interactions (MPIs). Responsive to consumer interactions with media content during playback of a media file, embodiments can produce MPIs corresponding to the consumer's changes in the playback presentation of the content. The MPIs can be associated with the media file as one or more sharable embedded MPIs (EMPIs). For example, the EMPIs can be embedded within the content data of the media file, integrated with metadata of the media file, stored as separate data linked to the media file (e.g., at particular timestamps, or the like), or otherwise embedded in a sharable manner with the media file. When the same or a different consumer subsequently accesses the content from the media file, embodiments permit playback of the content with selective access to the EMPIs. For example, a first consumer can share media content with its associated EMPIs, thereby permitting a second consumer control over which portions of the media content are played back with and without experiencing the first consumer's EMPIs.

According to one set of embodiments, a method is provided for providing embeddable and/or handling media playback interactions. The method includes: first outputting a media content file for playback in a first timeframe to a first user via an interactive media playback interface; receiving a set of media playback interactions from the first user via the interactive media playback interface during the playback of the media content file, the set of media playback interactions affecting playback presentation of the media content file; generating embedded media playback interaction (EMPI) data to logically associate the set of media playback interactions with the media content file; and second outputting enhanced media content in a second timeframe subsequent to the first timeframe, the enhanced media content embedding the EMPI data with the media content file to provide user-responsive playback of the set of media playback interactions to affect playback presentation of the media content file during the second outputting.

According to another set of embodiments, a media playback device is provided for providing and/or handling embeddable media playback interactions. The media playback device includes a playback subsystem and a media playback interaction embedder. The playback subsystem includes an interactive media playback interface, and the playback subsystem is to: first output a media content file for playback in a first timeframe to a first user via an interactive media playback interface; and receive a set of media playback interactions from the first user via the interactive media playback interface during the playback of the media content file, the set of media playback interactions affecting playback presentation of the media content file. The media playback interaction embedder is coupled with the playback subsystem to generate embedded media playback interaction (EMPI) data to logically associate the set of media playback interactions with the media content file, such that subsequent outputting of enhanced media content that embeds the EMPI data with the media content file provides user-responsive playback of the set of media playback interactions to affect playback presentation of the media content file during the subsequent outputting. Some embodiments further include a media playback interaction handler coupled with the playback subsystem to provide the user-responsive playback of the set of media playback interactions to affect the playback presentation of the media content file during the subsequent outputting. Some embodiments further include a communications subsystem configured to communicate the enhanced media content to the second user for playback responsive to the request from the first user.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 3A-3E show an example scenario in which a first user generates EMPIs, according to various embodiments;

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
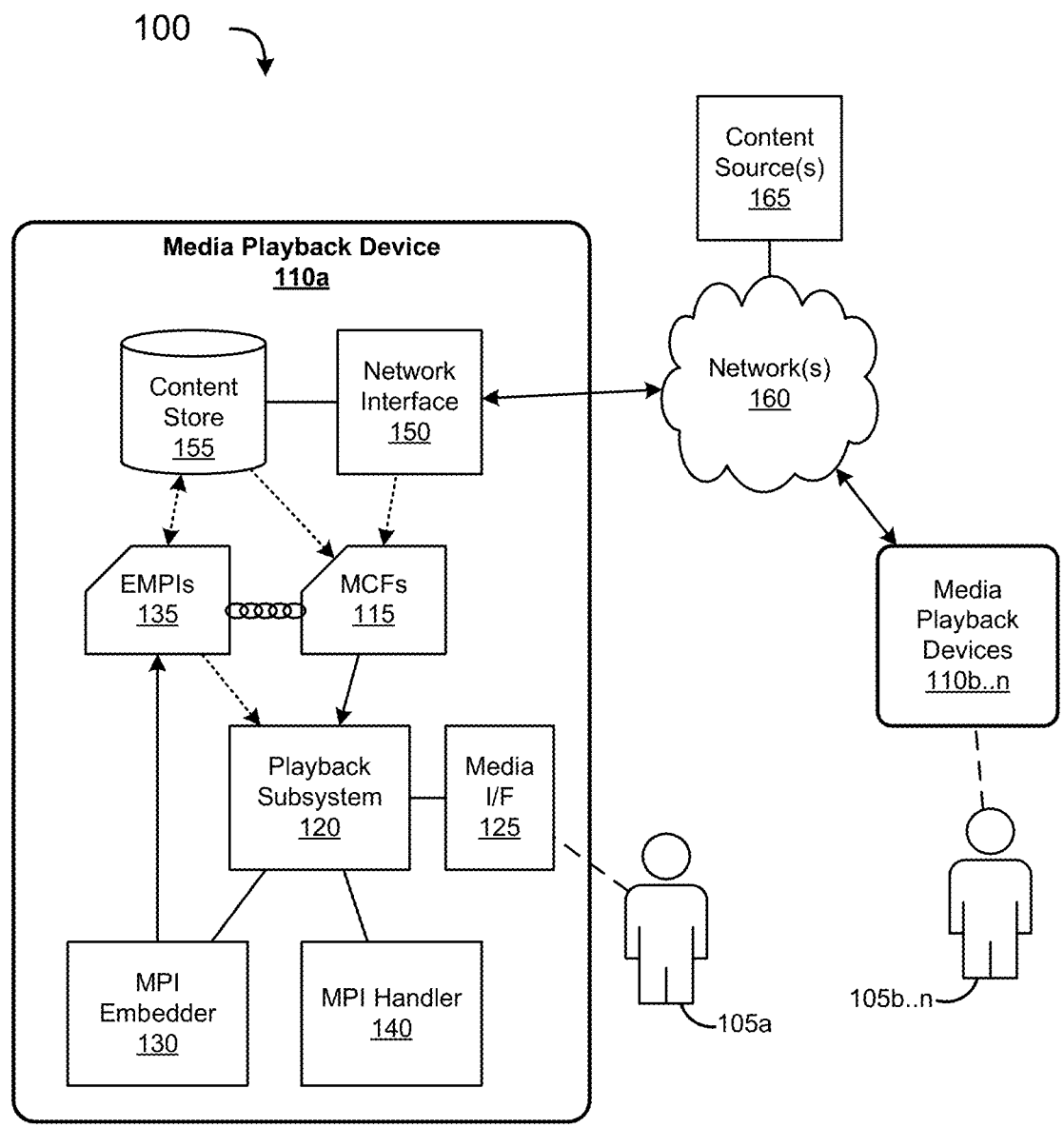
FIG. 1 shows a content consumption environment, according to various embodiments.

Turning first to FIG. 1, a content consumption environment 100 is shown, according to various embodiments. As illustrated, content consumption environment 100 includes one or more media playback devices 110. Each media playback device 110 can be implemented with any device or system that provides a content consumption environment for a user 105. For example, a media playback device 110 can be implemented as (or on) a smart phone, tablet computer, desktop computer, e-reader, wearable device (e.g., smart watch, fitness tracker), portable media player, etc. Each media playback device 110 can be associated with one or more users 105, who can consume audiovisual media content via the media playback devices 110. Such media playback devices 110 have become ubiquitous, such that users 105 have more access to different types of media now than ever before. Typically, media is accessible on such media playback devices 110 via streaming media services and/or from on-board and/or remote media storage.

As illustrated, embodiments of an illustrative media playback device 110 can include some or all of a playback subsystem 120, a media playback interaction (MPI) embedder 130, an MPI handler 140, a network interface 150, and a content data store 155. Embodiments of the playback subsystem 120 can include a media interface 125. Embodiments of the media interface 125 can include one or more types of media output components, such as one or more displays, speakers, etc. Embodiments of the media interface 125 can also include one or more types of interface components, such as one or more touchscreens, keyboards, computer mice, touchpads, buttons, cameras, microphones, environmental sensors, accelerometers, etc. The playback subsystem 120 can include any hardware (e.g., graphics accelerators, graphics processing units, audio processors, etc.), software (e.g., protocols, encoders, decoders, graphical interface handling software, media player software, etc.), and/or other components to output (playback) media content to users 105 and receive interactions from the users 105 during the outputting.

The playback subsystem 120 can obtain media for outputting from any suitable source. In some implementations, media is received from a content data store 155. Embodiments of the content data store 155 can include any suitable type of non-transient memory for storing media content files 115 and/or other data. In some implementations, the content data store 155 is integrated in housing of the media playback device 110. In other implementations, the content data store 155 is in a housing physically separate from that of the playback subsystem 120 and/or other components of the media playback device 110. For example, the content data store 155 is a separate storage appliance, or integrated within a separate device. In some implementations, the content data store 155 is distributed among multiple storage devices of any suitable type. Media content files 115 received from the content data store 155 are typically stored data, obtained by the playback subsystem 120 and/or other components of the media playback device 110.

Additionally or alternatively, implementations can obtain media from one or more remote content sources 165 via one or more communication networks 160 and the network interface 150. For example, the media playback device 110 can be in communication, via the network interface 150 and the one or more communication networks 160, with one or more content providers, content servers, cloud storage systems, etc. The communication networks 160 can include any suitable networks, such as any type of wired or wireless network, or combination thereof. Merely by way of example, the networks 160 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the networks 160 may include one or more network access points, such as wired or wireless network access points (e.g., base stations and/or internet exchange points). The network interface 150 can include any suitable components to facilitate communications with any suitable type of communication networks 160. For example, the network interface 150 can include one or more physical or logical communication ports, antennas, filters, amplifiers, tuners, protocol support, buffers, etc.

Media content files 115 can be received from remote content sources 165 in any suitable manner. In some cases, media is received as streaming media, for example using chunks of data, multiple files, adaptive bit-rate encoding, and/or any suitable streaming media protocols and techniques. In some such cases, the content data store 155 can include buffer storage to store portions of media content as received. In other cases, media is received as a complete media content file 115, for example, downloaded to the content data store 155. As used herein, the term "media content file" is intended broadly to include any suitable type of media data collection, even if not technically a single file. For example, one or more logically associated chunks of media data, multiple files representing particular media content, or the like can be referred to herein as a media content file 115.

In recent years, consumers have experienced a massive increase in access to different types of media content files 115 and to different types of media playback devices 110. Similarly, there has been a proliferation of new technologies allowing consumers to interact with media on their media playback devices 110 and to engage in social networking. However, there continue to be technical limitations to consumers' ability to share their own media consumption experiences with their social networks. For example, conventional media interfaces allow consumers to use interactions to impact their content consumption experiences, such as by navigating playback of media (e.g., by pausing, rewinding, jumping to a particular playback location, etc.), annotating media (e.g., by adding text, images, highlighting, voice-over content, etc.), adjusting the media itself (e.g., by adjusting zoom, rotation, cropping, coloring, brightness, contrast, etc.; applying filters; etc.), and/or performing other types of interactions. However, a first consumer typically has only a few limited options for sharing a media consumption experience with a second consumer.

One conventional option is for the first consumer to have the experience concurrently with the second consumer, such as in a same location or by video conferencing. For example, the multiple consumers watch a video together and interact in real time. While such an option can be effective for simultaneous consumption, it does not permit time-shifted sharing of media consumption experiences. Another conventional option is for the first consumer simply to share the original media and to describe any media interactions to the second consumer. For example, the first consumer can send a video file to the second consumer via social media, along with a caption instructing the second consumer to zoom in on a particular feature, to pay attention to a particular occurrence, etc. Such an option preserves the original media consumption experience for the second consumer (i.e., allows the second consumer to experience the media in its original form, without effects of the first consumer's interactions) and may provide some hint as to the first consumer's interaction experience, but it is likely to fall short of providing the second consumer with exactly the interaction experience of the first consumer and tends to rely on separate communications (e.g., the media file is separate from the communicated instructions). Another conventional option is for the first consumer to record himself or herself having the consumption experience, such that the recorded experience now becomes its own snapshot, video, etc. For example, the first consumer records video footage of himself zooming in on a particular portion of the media and pointing to something of interest, and sends the video footage to the second consumer. Such an option may more faithfully reproduce the first consumer's experience, but it may inhibit the second consumer's ability to experience the media in its original form (i.e., without the effects of the first consumer's interactions). Further, such an approach may result in concerns with video and/or audio quality (e.g., because the underlying media is effectively being re-recorded, in some cases), with rights regimes (e.g., because a new work is being created potentially without authorization to use the original work), etc.

Embodiments described herein provide novel techniques for capturing and embedding media playback interactions (MPIs) in ways that permit the MPIs to be shared for asynchronous (time-shifted) consumption and permit consumers to control whether and to playback media content with or without the effects of the MPIs. Generally, responsive to consumer interactions with media content during playback of a media file, embodiments can produce MPIs corresponding to the consumer's changes in the playback presentation of the content. The MPIs can be associated with the media content file 115 as one or more sharable embedded MPIs (EMPIs) 135. A consumer can share the media content file 115 with its associated EMPIs 135 in various ways. When the same or a different consumer subsequently accesses the content from the media content file 115, embodiments permit playback of the content with selective access to the EMPIs 135 (e.g., as enhanced media, as described herein). For example, a first consumer can share a media content file 115 with its associated EMPIs 135, thereby permitting a second consumer control over which portions of the media content are played back with and without experiencing the first consumer's MPIs.

Embodiments of the media playback device 110 include an MPI embedder 130 coupled with the playback subsystem 120. The MPI embedder 130 provides features associated with generating EMPIs 135 and/or embedding EMPIs 135. Embodiments can generate a set of interaction data corresponding to the set of MPIs, and generate a set of embedding data to associate the set of MPIs with respective media components of the media content file 115. In some implementations, each MPI is recorded with a respective set of interaction data that defines the associated interaction as one or more types of action, parameters associated with the type of action, graphical locations of the action relative to the media content being output, temporal locations of the action relative to the media content being output, etc. Amounts and types of interaction data can be determined according to action type, default settings, user-defined settings, and/or in any other suitable manner.

Embodiments can be configured to support some or all of many types of MPIs. One illustrative category of MPIs includes navigation interactions during playback. For example, the media interface 125 can include a graphical user interface, physical buttons, and/or other user interface elements to facilitate a desired type of movement through the content, such as by pausing and/or resuming playback; rewinding and/or fast-forwarding playback; skipping content and/or jumping to particular content locations; navigating by chapters, bookmarks, indices, etc.; playing content in reverse; adjusting playback speed; etc. Another illustrative category of MPIs permits adjusting the media during playback. For example, the media interface 125 can includes interface elements that permit the user to change playback bitrate, playback resolution, zoom, aspect ratio, rotation, cropping, coloring, brightness, contrast, etc. Another illustrative category of MPIs permits annotation of the media during playback. For example, the media interface 125 can includes interface elements that permit the user to add text, images, highlighting, voice-over content, etc. Such annotations can be overlaid on the content of the media content file 115 itself, added in a separate window, added in a surrounding region of a playback display, or in any other suitable manner. Many other types of MPI are possible.

Particular types and/or amounts of interaction data can be used to define different types of MPIs. As one example, suppose a user pauses playback. The interaction data can indicate that this is a "pause playback" action occurring at a particular timestamp location in the media. The interaction data may indicate additional information, such as a duration of the pause action, how the pause action was initiated (e.g., by interacting with a graphical user interface element, in response to a voice command, etc.), and/or any other suitable information. As another example, suppose the user now zooms in on a particular location of the frame displayed after previously pausing the playback (e.g., as per the previous example). One illustrative set of interaction data to define the MPI can indicate a "zoom-in" action that fully records the manner of the interaction, such as the specific manner of zooming in, the specific timing of the interaction, the specific manner of the interaction, etc.; such that playback of the interaction data will look identical to the interaction behavior of the user. Another illustrative set of interaction data corresponding to the same MPI can also indicate a "zoom-in" action, but with higher-level descriptors, such as a target final image representing a particular zoom level and location; such that the beginning image (the paused frame) and the final image (the zoomed-in image) mimic those of the user's interaction, but the specific zooming transition between the two images may not be identical. Another illustrative set of interaction data may correspond to the zoom-in action being recorded as multiple MPIs. For example, the zooming can be recorded as a sequence of events, each with corresponding interaction data.

As noted above, embodiments of the MPI embedder 130 generate the EMPIs 135 to include embedding data that provides associations between the recorded interaction data and the media content file 115. Different embodiments of the MPI embedder 130 can generate the embedding data in different ways. For example, the embedding data can be generated for storage in association with the interaction data (e.g., as a EMPI file), for storage in association with the media content file 115, and/or in any other suitable manner.

Figure 2A:
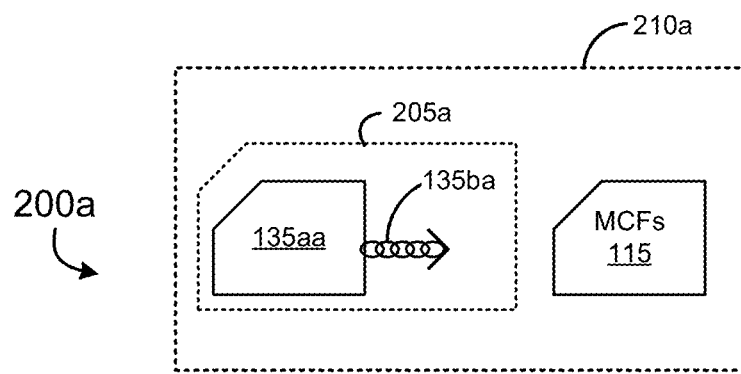
FIGS. 2A-2C show illustrative data structure assemblies for providing enhanced media data to support corresponding embedded media playback interactions (EMPIs) and media content files, according to various embodiments.
Figure 2B:
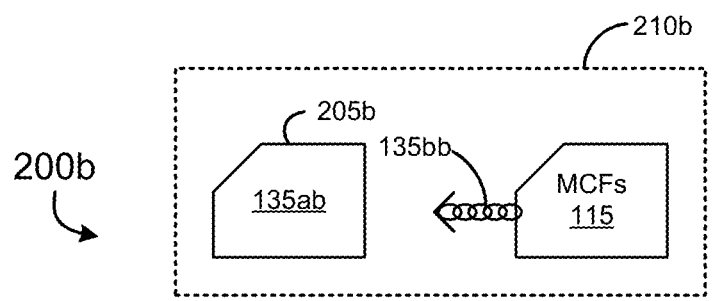
Figure 2C:
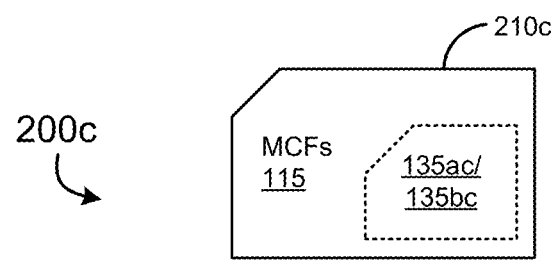

For the sake of illustration, FIGS. 2A-2C show illustrative data structure assemblies 200 for providing enhanced media data to support corresponding EMPIs 135 and media content files 115, according to various embodiments. In each data structure assembly 200, an illustrative type of enhanced media data 210 is shown as including one or more media content files 115 and one or more EMPIs 135. Each EMPI 135 is made up of an interaction data component (indicated as reference 135*a*) and an embedding data component (indicated as reference 135*b*). Turning first to FIG. 2A, the data structure assembly 200*a* shows a first illustrative type of enhanced media data 210*a* as generated by an embodiment of the MPI embedder 130. In this first type of enhanced media data 210*a*, the EMPI 135*a* is illustrated as having its interaction data 135*aa* and embedding data 135*ba* stored together as part of an EMPI file 205*a*. The MPI embedder 130 can be configured to generate the EMPI data by storing the set of interaction data 135*aa* and the set of embedding data 135*ba* as the EMPI file 205*a* separate from the media content file 115, such that the set embedding data 135*ba* defines one or more logical linkages from the EMPI file 205*a* to the media content file 115. For example, such logical linkages can include pointers to certain images, timestamps, bit locations, and/or other identifiable portions of the media content files 115. When concurrently playing back the media content file 115 and executing the EMPI file 205*a* (e.g., effectively playing back the sequences, instructions, recorded interactions, etc. defined by the EMPI file 205*a*), the logical linkages effectively associate the recorded MPIs with the appropriate portions of the media content files 115 as replacement data, as overlay data, as metadata, and/or in any other suitable manner.

In such embodiments, the EMPI files 205*a* can be associated with, but still separable from the media content files 115. For example, metadata or content data of EMPI files 205*a* can include one or more identifiers for the associated media content files 115, such as a file name, file location, data descriptors (e.g., cryptographic hashes and/or other fingerprints of the data to help ensure a retrieved file matches the correct media content file 115), etc. This can allow EMPI files 205*a* to be stored (e.g., locally in the content data store 155, remotely, etc.), without relying on storage of the associated media content files 115. As such, the EMPI data can be saved to storage media more quickly, retrieved from storage media more quickly, maintained with less consumption of storage space, communicated over one or more communication networks 160 with less bandwidth, etc. Further, in such embodiments, the media content files 115 can be left unaltered. As such, EMPIs 135 can be stored, maintained, altered, shared, etc. without any storage of, alteration of, or even access to the associated media content files 115. Maintaining separation from the media content files 115 themselves can also support certain rights regimes, such as digital rights management regimes. For example, while a user may not have the rights to store a media content file 115, alter the media content file 115, share or distribute the media content file 115, etc.; such embodiments can still generate and share EMPI files 205*a*. In such a case, playback of the EMPI files 205*a* by a receiving user may involve the user separately accessing the associated media content files 115 from an authorized provider, with proper credentials, etc.

Turning to FIG. 2B, the data structure assembly 200*b* shows a second illustrative type of enhanced media data 210*b* as generated by an embodiment of the MPI embedder 130. In this second type of enhanced media data 210*b*, the EMPI 135*b* is illustrated as having its interaction data 135*ab* stored as part of an EMPI file 205*b*, and its embedding data 135*bb* integrated with the media content file 115. The MPI embedder 130 can be configured to generate the embedding data 135*bb* to define one or more logical linkages from the media content file 115 to the EMPI file 205*b*. For example, such logical linkages can point to stored MPIs defined by the interaction data 135*ab* from corresponding portions of the media content file 115, such as from particular images, timestamps, bit locations, etc. During playback of the media content file 115, access to relevant recorded MPIs can be provided by accessing the logical linkages to point to appropriate definitions in the interaction data 135*ab* of the EMPI file 205*b*.

Unlike the approach of FIG. 2A, the approach of FIG. 2B relies on some adaptation of the media content files 115 themselves. Some implementations involve a lightweight adaptation of the media content files 115. In one such implementation, the embedding data 135*bb* is stored as wrappers around media content files 115, leaving the media content files 115 unaltered within the wrapper. In another such implementation, the embedding data 135*bb* is stored as metadata of the media content files 115, leaving the content portion of the media content files 115 unaltered. Other implementations alter the content of the media content files 115 more directly. For example, as described herein, during playback of the enhanced media 210, embodiments display a graphical indication of availability of EMPI data, which allows a user to selectively playback the EMPI data to alter the playback of the media content file 115 in accordance with previously recorded MPIs. In some implementations, such a graphical indication is embedded in playback of the media content file 115 by using a wrapper or metadata to direct the media interface 125 to display such an indication (e.g., directing the media interface 125 to activate a predefined graphical user interface element, directing the media interface 125 to overlay a particular graphic, etc.). In other implementations, such a graphical indication is embedded in playback of the media content file 115 by inserting the graphical indication into the video content data of the media content file 115 itself.

Approaches of FIG. 2B can provide various features. One feature is that, while the approaches rely on some adaptation of the media content files 115, the media content files 115 can still be maintained separately from the EMPI files 205b. For example, the media content files 115 and EMPI files 205b can be stored in different locations, within different rights regimes (e.g., accessible with different credentials), etc. Another feature is that the media content files 115 may be obtained separately from the EMPI files 205b, and the EMPI files 205b may be obtained only as needed. For example, in the approach of FIG. 2A, the media content files 115 themselves may not include any indication of whether any EMPIs 135 are associated with the media content files 115, let alone how to playback those EMPIs 135 during playback of the media content files 115. As such, the approach of FIG. 2A may rely on having the EMPI files 205a obtained and running (e.g., in the background) during playback of the media content files 115, even if none of the MPIs are ultimately selected for playback. In contrast, the approach of FIG. 2B can permit playback of the media content files 115 to occur without even accessing the EMPI files 205b, as the media content files 115 themselves include the embedding data 135bb. For example, a large media content file 115 can begin streaming, buffering, and playing, along with presenting graphical indications of availability of any relevant MPIs, without relying on first obtaining the EMPI files 205b and/or concurrently playing back the EMPI file 205b data.

Turning to FIG. 2C, the data structure assembly 200c shows a third illustrative type of enhanced media data 210c as generated by an embodiment of the MPI embedder 130. In this third type of enhanced media data 210c, the EMPI 135c is illustrated as being fully embedded with the media content file 115 as an enhanced media file. The MPI embedder 130 generates a single file or set of associated files to include all of the media content file 115 content, the interaction data 135ac, and the embedding data 135bc. For example, sharing the EMPIs 135 involves sharing a new file (or set of files) that is an integrated set of data including media content and EMPI data.

Unlike the approaches of FIGS. 2A and 2B, the approach of FIG. 2C relies on full integration of the media content and EMPI data in a single enhanced media file. In some implementations, the enhanced media file is a proprietary file type that is configured to interact with the media interface 125 (e.g., with proprietary application programming interfaces, with a proprietary media interface 125, etc.) to implement features described herein. For example, a plugin application, media viewer application, or the like is downloaded and installed by a user prior to generation and/or playback of the enhanced media file. Approaches of FIG. 2C can provide various features. One feature is that having the content and EMPI data all integrated within a single file stored in a single location can help avoid situations of partial file access. For example, in certain implementations of FIG. 2A or 2B, a situation can arise where a user is able to access one of the media content file 115 or EMPIs 135, but not the other (e.g., because a server is down, because of a mismatch in credentials, because of file corruption, etc.); but approaches of FIG. 2C can avoid such a situation. Another feature is that integrating the files can help avoid concerns with revision control. For example, modification or removal of a media content file 115 can corrupt logical linkages and/or other types of EMPI data, as they may now relate to modified or non-existent portions of the media content file 115 (e.g., or may point to non-existent files, etc.).

Returning to FIG. 1, the embodiments of the MPI embedder 130 facilitate generation of EMPIs 135, storage of EMPIs 135, sharing of EMPIs 135, and/or other similar front-end EMPI features. Embodiments of the media playback device 110 can also include an MPI handler 140 to provide back-end EMPI features, such as retrieval and playback of enhanced media in accordance with the EMPIs 135. Some embodiments of media playback devices 110 include an MPI embedder 130 without an MPI handler 140 (e.g., to provide enhanced media creation, but not playback). Other embodiments of media playback devices 110 include an MPI handler 140 without an MPI embedder 130 (e.g., to provide enhanced media playback, but not creation). Other embodiments of media playback devices 110 include both an MPI embedder 130 and an MPI handler 140, as illustrated with respect to media playback device 110a of FIG. 1.

The MPI embedder 130 and/or MPI handler 140 of a particular media playback device 110 can be in communication with the local content data store 155 of the media playback device 110, and can also be in communication with other media playback devices 110, remote content sources 165, remote data storage, etc. via the one or more communication networks 160 and the network interface 150. As such, various types of enhanced media data (e.g., the various types of data structure assemblies 200 and corresponding types of enhanced media data 210 of FIGS. 2A-2C) can be stored, shared, and obtained in different ways by different implementations of the MPI embedder 130 and/or MPI handler 140.

In one illustrative implementation of FIG. 2A, the EMPI file 205a can be generated by the MPI embedder 130 and stored in the content data store 155 of the media playback device 110a on which the EMPI file 205a was generated (the "source" media playback device 110a). Subsequent playback by the source media playback device 110a (e.g., by a same first user 105a who performed the MPIs, or by a different user 105b using the same source media playback device 110a) can involve retrieval of the EMPI file 205a from the local content data store 155; and retrieval of the media content file 115 can be from the local content data store 155 (e.g., a locally stored instance of the content), or from a remote source (e.g., from a content source 165 via a communication network 160). Subsequent playback by a target media playback device 110b (e.g., a device of a different user 105b with whom the MPIs are being shared) can involve communication of the EMPI file 205a from the source media playback device 110a to the target media playback device 110b, and/or communication of the EMPI file 205a from the source media playback device 110a to a shared access storage location (e.g., a public server, networked private server, the Internet, etc.) with subsequent retrieval by the target media playback device 110b from the shared access storage location. The target media playback device 110b can similarly access the media content file 115 from the content data store 155 of the source media playback device 110a, from a content data store 155 of the target media playback device 110b (e.g., where the target media playback device 110b has a local copy of the content), from a shared access storage location, etc.

Generation of the enhanced media data can happen in response to various types of triggers. In some embodiments, the playback subsystem 120 receives a request from a first user 105a to share the EMPIs 135. The request can indicate a particular second user 105b or group of other users 105 with whom to share the EMPIs 135, or the request can be to provide the EMPIs 135 in a shared manner without designating any particular user (e.g., to upload the EMPIs 135 to a shared access location, to publish availability of the EMPIs 135, etc.). In some such embodiments, the MPI embedder 130 can embed the EMPIs 135 with the media content files 115 to generate the enhanced media content responsive to receiving the request. For example, as described with reference to FIGS. 2A-2C, the MPI embedder 130 can generate one or more EMPI files 205 and/or other file components of data structure assemblies 200 to support the enhanced media. The generated enhanced media data can be locally stored in the content data store 155, pushed out to a remote storage location, pushed to the one or more other users, etc. A subsequent request to playback the enhanced media can involve accessing the enhanced media data previously generated by the MPI embedder 130.

In other embodiments, the MPI embedder 130 generates EMPIs 135 and/or other related data, but does not fully generate the enhanced media content. Instead, subsequent to generation of the EMPIs 135 (and/or related data), the playback subsystem 120 receives a request (e.g., from the same user 105a or a second user 105b, on the same or a different media playback device 110) to playback an enhanced version of the media content file 115. In some such embodiments, the MPI embedder 130 can embed the EMPIs 135 with the media content files 115 to generate the enhanced media content responsive to receiving the request. In other such embodiments, the MPI handler 140 can embed the EMPIs 135 with the media content files 115 to generate the enhanced media content responsive to receiving the request. For example, a first user 105a performs the MPIs with a first media playback device 110a, and the MPI embedder 130 of the first MPI embedder 130 generates EMPIs 135; and a second user 105b subsequently requests the EMPIs 135 via a second media playback device 110b, and the MPI handler 140 of the second media playback device 110b generates the enhanced media, accordingly.

As described herein, embodiments described herein seek to embed the EMPIs 135 with the media content files 115, such that subsequent outputting of the resulting enhanced media content by the MPI handler 140 provides user-responsive playback of the set of MPIs to affect playback presentation of the media content file during the subsequent outputting. As a user 105 is playing back enhanced media content, the user 105 can opt to playback the media content with or without the playback being affected by any of the previously recorded MPIs captured by the enhanced media content. In one implementation, unaffected playback is the default (i.e., no playback of any of the EMPIs 135); the user 105 can consume the media substantially as originally presented, unless the user 105 explicitly opts to playback one or more of the EMPIs 135. In another implementation, default playback involves playback of all EMPIs 135, and interaction by the user 105 is needed to selectively avoid playback of one or more EMPIs 135. In another implementation, a portion of the EMPIs 135 is played back according to user preferences (e.g., of the user who performed the MPIs, and/or of the user who is playing back the EMPIs 135).

In some implementations, the user 105 may not know in advance that enhanced media is being played. For example, the user 105 may playback a media content file 115, and may subsequently become aware that there are available EMPIs 135 (e.g., generated previously by a different user 105) with which to selectively interact. In other implementations, the user 105 may playback the enhanced media in response to sharing of the enhanced media. For example, a second user 105b may see that a first user 105a posted the enhanced media to social media or another shared access location with an interactive link to the enhanced media data, or that the first user 105a specifically sent the enhanced media (or a link to the enhanced media) to the second user 105b, etc.; and the second user 105b can playback the enhanced media by interacting with the obtained link or files. In other implementations, the user 105 obtains the enhanced media responsive to a search query, or in any other suitable manner.

An indication can be provided in connection with playback of the enhanced media content to indicate availability of EMPIs 135, and/or generally that the media being played back is enhanced media content. The indicator can include a visual indication (e.g., text, icon, highlighting, illumination of an indicator, etc.), audio indication (e.g., a beep or tone), haptic indication (e.g., vibration of the media playback device 110b), and/or other indications of available EMPIs 135. The indicator can be provided in any suitable location and/or manner, for example using the same media playback device 110 on which the media is being played back, or on a different device in communication with the media playback device 110.

User interaction with the indicator causes playback of one or more of the EMPIs 135. In some implementations, user interaction with the indicator involves the user interacting with the indicator itself (e.g., by using an input device to select the indicator). In other implementations, user interactions with the indicator involve user interactions with any suitable control or interface element that the system interprets as an intended user interaction with the indicator. For example, while the indicator is active, a user clicking anywhere in the display window causes playback of relevant EMPIs 135. In some implementations, the indicator is displayed during the entire playback of the enhanced media, and interaction with the indicator toggles between original playback of the media content (i.e., without any effects of EMPIs 135) and affected playback of the media content (i.e., affected by one or more of the EMPIs 135). In other implementations, interaction with the indicator causes a next available EMPI 135, or a logical set of next available EMPIs 135, to playback. In other implementations, the indicator is provided in temporal proximity to an available EMPI 135. For example, the indicator appears in the display (or is otherwise presented to the user 105) some predetermined amount of time prior to a temporal location of an EMPI 135, and remains until a relevant window for playback of the EMPI 135 has passed.

The particular implementation of the indicator can depend on characteristics of the underlying media content, user preferences, and/or other factors. As one example, the media content is a full-length movie, and a shared set of EMPI 135 only affects a few seconds of the movie. In such a case, if the user 105 is watching the entire move, it may be undesirable to display a graphical indicator (e.g., potentially obscuring or distracting from consumption of the original media content), except during the timeframe where relevant. As another example, if the user 105 is only watching a short clip from the movie specifically to see the EMPIs 135, the user 105 may not mind having a graphical indicator displayed for the entire duration. As another example, the media content may be only a single image, such as a photograph, such that there may be no temporal data associated with the EMPIs 135. In such a case, the indicator may be active and presented to the user along with displaying the photograph. As another example, the media content is manipulable (e.g., partially or fully immersive) content, such as three-dimensional computer-aided design (3D CAD) files, an immersive virtual reality environment, an interactively moldable medium (e.g., like virtual clay), or the like, in which users are intended to control the viewpoint, perspective, shape, etc. In such cases, the indicator may be presented along with display of the manipulable content, such as by being displayed in a pop-up menu, overlaid in the display screen, etc.

Playback of the EMPIs 135 can be implemented in any suitable manner. In some implementations, playback of the EMPIs 135 effectively replaces original playback with affected playback during a playback window of the EMPIs 135. In other implementations, original playback of the content is paused during affected playback in accordance with selected EMPIs 135, and playback returns to the original playback upon completion of the affected playback (e.g., by default, after prompting the user to return to original playback, etc.). Other implementations provide concurrent playback of the original and affected versions of the content. For example, at least during times where a portion of the playback includes affected playback in accordance with selected EMPIs 135, the original or affected playback occurs in a pop-up window, a picture-in-picture window, a separate frame, a separate tab or window, a separate display, etc.

For the sake of illustration, FIGS. 3A-3E show an example scenario in which a first user 105a generates EMPIs 135, according to various embodiments. An illustrative first media playback device 110a is shown in FIG. 3A as a smart phone, portable video game console, or other similar device. A first user 105a is watching a video via the media playback device 110a. For example, the video is a media content file 115 being played by the playback subsystem 120 via components (e.g., a display, speakers, etc.) of the media interface 125. As the user 105a watches a scene of a cityscape, she notices something odd in the sky that appears to be a pair of unidentified flying objects (UFOs). A sequence of MPIs then transpires. Beginning at FIG. 3A, the user 105a pauses playback of the media content file 115. As illustrated in FIG. 3B, she is then recorded (or explicitly records herself) as stating "Check out what is in the sky!!" As illustrated in FIG. 3C, the user 105a then draws a circle around a portion of the frame in which she spotted the UFOs. For example, the user 105a uses a stylus, touchscreen interface, or any other input device to draw the circle. As illustrated in FIG. 3D, the user 105a then begins zooming in on the circled portion of the frame. Ultimately, as illustrated in FIG. 3E, the user 105 zooms all the way into a view of one of the UFOs, rotates the frame to present the UFO in an upright alignment, and overlays a text box with "!!!" in a bottom right corner of the display frame.

The MPIs represented by FIGS. 3A-3E can be recorded in any suitable manner. In some implementations, the user 105a first activates MPI recording (e.g., via controls of the media interface 125, using a separate application, or in any suitable manner), which configures the system to begin detecting and recording MPIs. In other implementations, MPI recording is already running (e.g., always running as a background process; always running during playback of certain types of media; etc.), such that MPIs are recorded without preceding action by the user 105a. Further, FIGS. 3A-3E are not intended to correspond to any particular MPI or timing. For example, each of FIGS. 3A-3E can be considered as illustrating a single MPI, multiple MPIs, a portion of an MPI, etc.; and transitions between those Figures may be substantially immediate, or may take any suitable amount of time.

Figure 4A:
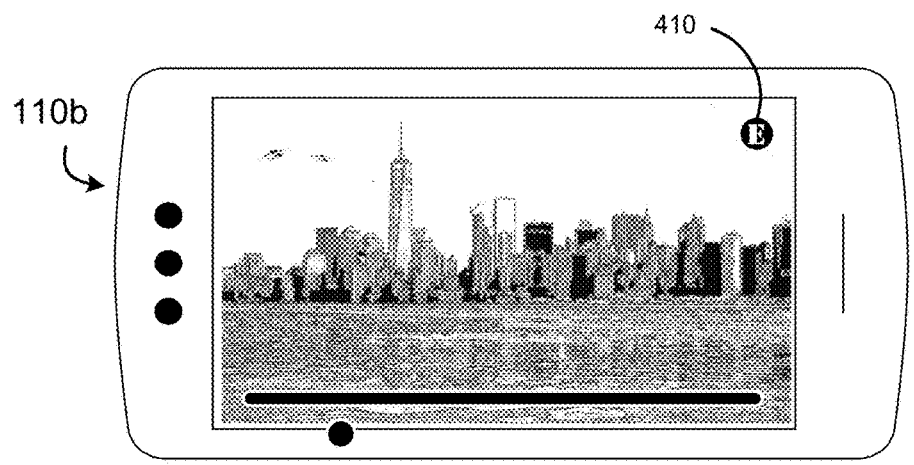
FIGS. 4A-4F show an example scenario in which a second user plays back enhanced media content, subsequent to generation of the enhanced media content described in FIGS. 3A-3E, according to various embodiments.

FIGS. 4A-4F show an example scenario in which a second user 105b plays back enhanced media content, subsequent to generation of the enhanced media content described in FIGS. 3A-3E, according to various embodiments. An illustrative second media playback device 110b is shown in FIG. 4A as a smart phone, portable video game console, or other similar device. In some cases, the second media playback device 110b is the first media playback device 110a, only at a subsequent time. A second user 105b is watching video content via the second media playback device 110b, and the second media playback device 110b includes a MPI handler 140. For example, the video content is from the same media content file 115 described in FIGS. 3A-3E, but the content is enhanced with EMPIs 135 (e.g., according to one of the techniques described in FIGS. 2A-2C).

In some implementations, the second user 105b may not know in advance that enhanced media is being played. For example, the user 105b may playback a media content file 115, and may subsequently become aware that there are available EMPIs 135 with which to selectively interact. In other implementations, the second user 105b may playback the enhanced media in response to sharing of the enhanced media. For example, the second user 105b may see that the first user 105a (from FIGS. 3A-3E) posted the enhanced media to social media or another shared access location with an interactive link to the enhanced media data, or that the first user 105a specifically sent the enhanced media (or a link to the enhanced media) to the second user 105b, etc.; and the second user 105b can playback the enhanced media by interacting with the obtained link or files. In other implementations, the second user 105b obtains the enhanced media responsive to a search query, or in any other suitable manner.

As illustrated in FIG. 4A, a graphical indicator 410 can be displayed in connection with playback of the enhanced media content on the second media playback device 110b. Display of the graphical indicator 410 can be within the playback window of the media content, or in any other suitable location, such as around the periphery of the display window, in a toolbar or menu, etc. While illustrated as a small icon, the graphical indicator 410 can be implemented as any suitable indication (e.g., text, highlighting, change of coloring, framing, etc.). As noted above, the indicator can include any suitable additional and/or alternate indicators, such as audio, visual, haptic, and/or other indications of available EMPIs 135. In some implementations, the graphical indicator 410 and/or other indication is provided on a separate device in communication with the media playback device 110b, such as by displaying an indication of available EMPIs 135 on a smart watch of the user 105b during playback of the media content on a smart phone of the second user 105b.

Figure 4B:
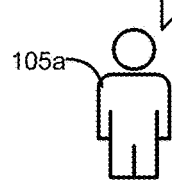
Figure 4C:
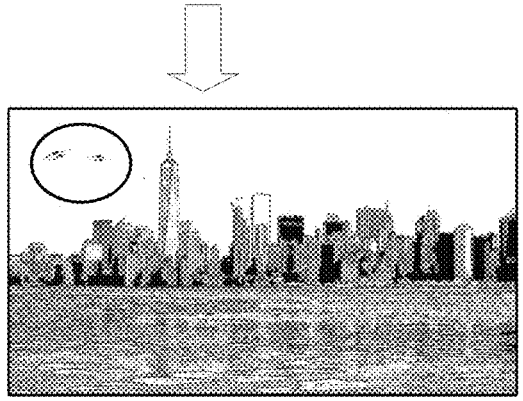
Figure 4D:
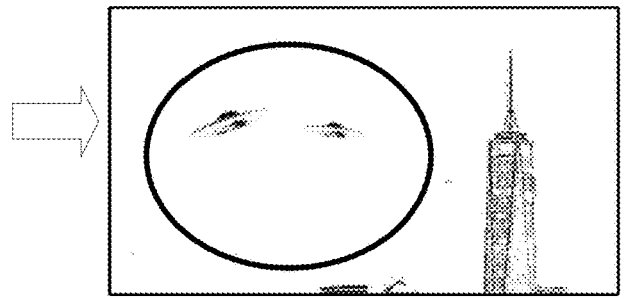
Figure 4F:
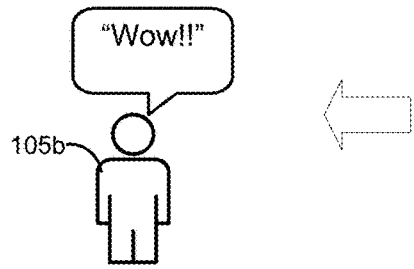
Figure 4E:
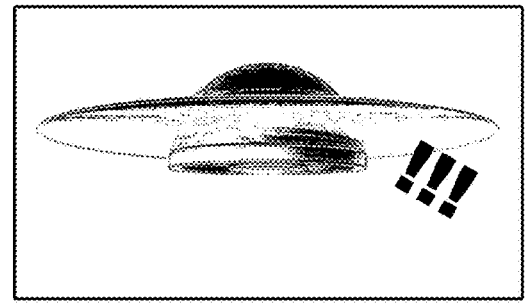

In the illustrated example, during playback of the media content by the second user 105b via the second media interface 125b, the second user 105b reaches a temporal location corresponding to the previously recorded and embedded set of EMPIs 135 described in FIG. 3A-3E. The user 105b interacts with the graphical indicator 410, for example, by using a pointer device or a touchscreen interface to select (e.g., click on) the graphical indicator 410. In response to the interaction the EMPIs 135 begin to playback in sequence, affecting playback of the media content in corresponding ways. For example, as the user 105b continues to watch the scene of the cityscape with affected playback enabled, the video playback automatically pauses, and the user 105b hears the first user 105a exclaim: "Check out what is in the sky!!" (as illustrated by FIG. 4B. The user 105b then sees a circle appear around a portion of the frame (FIG. 4C), and the frame begin to zoom in (FIG. 4D) until ultimately zooming all the way into an aligned view of one of the UFOs overlaid exclamation points (FIG. 4E). In some embodiments, playback of the EMPIs 135 by the second user 105b can be controlled in various ways by the second user 105b. For example, some embodiments permit the second user 105b to step through the EMPIs 135 (e.g., sequentially), to navigate playback of the EMPIs 135 (e.g., pause, rewind, change playback speed, etc.), etc.

In some embodiments, the second user 105b can provide additional MPI data in association with (e.g., in reaction to) playback of the EMPIs 135. As illustrated in FIG. 4F, the second user 105b can respond with a recorded audio exclamation of "Wow!!" at the end of the playback. As other examples, the second user 105b can annotate and/or otherwise interact with one or more frames of the EMPI 135 playback, and/or with any other portion of the media content file 115. For example, the second user 105b can add further MPIs to the same media content files 115. In some embodiments, the additional MPIs from the second user 105b can be embedded into the same media content files 115 as part of the same enhanced media content (e.g., as a new version of an enhanced media file, as an updated set of logical linkages, etc.). In other embodiments, the additional MPIs from the second user can be integrated with the same original media content files 115, but as separate enhanced media content from what was generated earlier. For example, there can be one enhanced version of the media content files 115 corresponding to the MPIs of the first user 105a only, and another enhanced version of the media content files 115 corresponding to the MPIs of the second user 105b only. In other embodiments, the multiple sets of MPIs from different users can be associated with metadata, or other suitable identifiers of the creator or creators of the MPIs; and can be interacted with as such. As one example, a subsequent user 105 can opt to playback media with all EMPIs 135, only EMPIs 135 associated with a particular user, etc. As another example, a user 105 may desire to view all EMPIs 135 created by users 105 other than herself, without viewing her own EMPIs 135.

Figure 5:
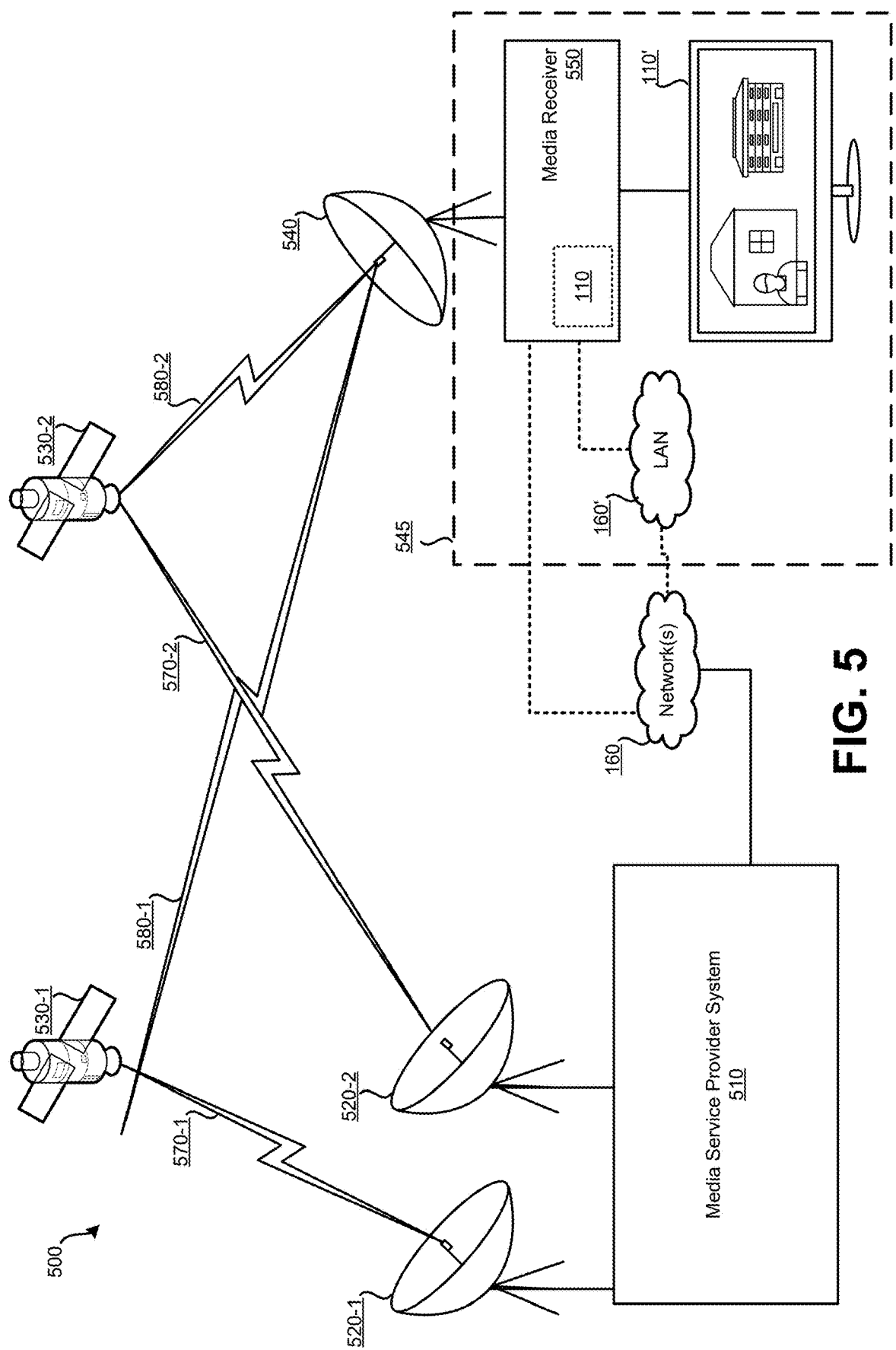
FIG. 5 shows an illustrative satellite television distribution system as an example context for various embodiments described herein.

The automated response features described herein can be implemented in context of any suitable communications system. FIG. 5 shows an illustrative satellite television distribution system 500 as an example context for various embodiments described herein. Satellite television distribution system 500 may include: television service provider system 510, satellite transmitter equipment 520, satellites 530, satellite dish 540, and media receiver 550. The illustrated embodiment shows the media playback device 110 implemented by the media receiver 550. As one example, the media playback device 110 can be an application or subsystem of a set-top box or other media receiver 550 (e.g., with the playback subsystem 120 in communication with a television or other playback device 110'). As another example, a set-top box or other television receiver 550 can be implemented as an application or subsystem of the media playback device 110. Alternatively, the media playback device 110 can be implemented as a separate device in communication with the media receiver 550 (e.g., via a local area network 160'). As noted above, other implementations can use different architectures, for example, implementing certain features in the media receiver 550 and other features in the television service provider system 510 or other suitable location. Further, alternate embodiments of satellite television distribution system 500 may include fewer or greater numbers of components. While only one satellite dish 540, media receiver 550, and other related components (collectively referred to as "user equipment") are illustrated, it should be understood that multiple (e.g., tens, thousands, millions) instances of user equipment may receive television signals from television service provider system 510 via satellites 530. Further, while embodiments are described in particular context of a satellite television distribution system 500, techniques described herein can also be implemented in context of other television and media distribution architectures and infrastructures, such as cable television distribution networks.

The user equipment is shown disposed at a subscriber premises 545. The subscriber premises 545 can be a subscriber's home, office, or any suitable location associated with a particular subscriber at which to locate the subscriber's satellite dish 540 and media receiver 550. As one example, the satellite dish 540 is mounted to an exterior location (e.g., wall, roof, etc.) of the subscriber's home, and cables run from the satellite dish 540 to the media receiver 550, which is located inside the subscriber's home; and one or more display devices 110' (e.g., televisions) is coupled with the media receiver 550 and located in the subscriber's home.

Other user equipment can be in the subscriber's premises 545 that may or may not be directly associated with the television service provider. The user equipment can include a LAN router in communication with the network 160. The LAN router can be implemented as any suitable device or set of devices that creates a local network 160' from the network 160 connection. For example, the LAN router can include any suitable routers, switches, modems, wireless transceivers, wired ports, etc. Though described as a "LAN," the LAN router can create any suitable type of network, such as a wide-area network (WAN), a home-area network (HAN), a wireless local-area network (WLAN), etc. The LAN router can be in communication with the media receiver 550 using a wired or wireless communications link. The LAN router can also provide local connectivity with one or more additional subscriber devices, such as one or more media playback devices 110. As described herein, embodiments of the media playback device 110 can playback one or more of: live television programming received via the media receiver 550 (e.g., linearly broadcast television programming), on-demand television programming receivable via the media receiver 550, on-demand television programming locally cached by the media receiver 550, other recorded media locally cached by the media receiver 550, subscription media available via the Internet or other content distribution channels, etc.

Television service provider system 510 and satellite transmitter equipment 520 may be operated by a television service provider. A television service provider may distribute television channels, on-demand programming, programming information, and/or other content/services to users. Television service provider system 510 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites 530. Each satellite 530 may relay multiple transponder streams. Satellite transmitter equipment 520 (520-1, 520-2) may be used to transmit a feed of one or more television channels from television service provider system 510 to one or more satellites 530. While a single television service provider system 510 and satellite transmitter equipment 520 are illustrated as part of satellite television distribution system 500, it should be understood that multiple instances of transmitter equipment may be used, possibly scattered geographically, to communicate with satellites 530. Such multiple instances of satellite transmitting equipment 520 may communicate with the same or with different satellites 530. Different television channels may be transmitted to satellites 530 from different instances of transmitting equipment 520. For instance, a different satellite dish of satellite transmitter equipment 520 may be used for communication with satellites 530 in different orbital slots.

Satellites 530 may be configured to receive signals, such as streams of television channels, from one or more satellite uplinks such as satellite transmitter equipment 520. Satellites 530 may relay received signals from satellite transmitter equipment 520 (and/or other satellite transmitter equipment) to multiple instances of user equipment via transponder streams. Different frequencies may be used for uplink signals 570 from transponder streams 580. Satellites 530 may be in geosynchronous orbit. Each of the transponder streams transmitted by satellites 530 may contain multiple television channels transmitted as packetized data. For example, a single transponder stream may be a serial digital packet stream containing multiple television channels. Therefore, packets for multiple television channels may be interspersed.

Multiple satellites 530 may be used to relay television channels from television service provider system 510 to satellite dish 540. Different television channels may be carried using different satellites 530. Different television channels may also be carried using different transponders of the same satellite 530; thus, such television channels may be transmitted at different frequencies and/or different frequency ranges. As an example, a first and second television channel may be relayed via a first transponder of satellite 530-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 540 may be a piece of user equipment that is used to receive transponder streams from one or more satellites, such as satellites 530. Satellite dish 540 may be provided to a subscriber for use on a subscription basis to receive television channels provided by the television service provider system 510, satellite transmitter equipment 520, and/or satellites 530. Satellite dish 540, which may include one or more low noise blocks (LNBs), may be configured to receive transponder streams from multiple satellites and/or multiple transponders of the same satellite. Satellite dish 540 may be configured to receive television channels via transponder streams on multiple frequencies. Based on the characteristics of media receiver 550 and/or satellite dish 540, it may only be possible to capture transponder streams from a limited number of transponders concurrently. For example, a tuner of media receiver 550 may only be able to tune to a single transponder stream from a transponder of a single satellite at a given time. The tuner can then be re-tuned to another transponder of the same or a different satellite. A media receiver 550 having multiple tuners may allow for multiple transponder streams to be received at the same time.

In communication with satellite dish 540 may be one or more media receivers. Media receivers may be configured to decode signals received from satellites 530 via satellite dish 540 for output and presentation via a display device, such as display device 125. A media receiver may be incorporated as part of a television or may be part of a separate device, commonly referred to as a set-top box (STB). Media receiver 550 may decode signals received via satellite dish 540 and provide an output to display device 125. A media receiver 550 is defined to include set-top boxes (STBs) and also circuitry having similar functionality that may be incorporated with another device. For instance, circuitry similar to that of a media receiver 550 may be incorporated as part of a television, and/or such circuitry can be implemented in multiple appliances. While FIG. 5 illustrates an embodiment of media receiver 550 as separate from display components of the media playback device 110 (e.g., display device 110'), it should be understood that, in other embodiments, similar functions may be performed by a media receiver integrated with display device 110'. As described herein, display device 110' may be used to present video and/or audio decoded and output by media receiver 550, such as media content files 115, and enhanced media content having media content playback selectively affected by EMPIs 135.

Uplink signal 570-1 represents a signal between satellite transmitter equipment 520 and satellite 530-1. Uplink signal 570-2 represents a signal between satellite transmitter equipment 520 and satellite 530-2. Each of uplink signals 570 may contain streams of one or more different television channels. For example, uplink signal 570-1 may contain a first group of television channels, while uplink signal 570-2 contains a second group of television channels. Each of these television channels may be scrambled such that unauthorized persons are prevented from accessing the television channels.

Transponder stream 580-1 represents a transponder stream signal between satellite 530-1 and satellite dish 540. Transponder stream 580-2 represents a transponder stream signal between satellite 530-2 and satellite dish 540. Each of transponder streams 580 may contain one or more different television channels, which may be at least partially scrambled. For example, transponder stream 580-1 may be a first transponder stream containing a first group of television channels, while transponder stream 580-2 may be a second transponder stream containing a different group of television channels. When a television channel is received as part of a transponder stream and is decoded and output to display device 110' (rather than first storing the television channel to a storage medium as part of DVR functionality then later outputting the television channel from the storage medium), the television channel may be considered to be viewed "live." In some cases, "live" playback can include direct streaming and playback of over-the-top media, Internet media, and/or any other suitable media.

FIG. 5 illustrates transponder stream 580-1 and transponder stream 580-2 being received by satellite dish 540 and distributed to media receiver 550. For a first group of television channels, satellite dish 540 may receive transponder stream 580-1 and for a second group of channels, transponder stream 580-2 may be received. Media receiver 550 may decode the received transponder streams. As such, depending on which television channels are desired to be presented or stored, various transponder streams from various satellites may be received, descrambled, and decoded by media receiver 550.

Network 160 may serve as a secondary communication channel between television service provider system 510 and media receiver 550. However, in many instances, media receiver 550 may be disconnected from network 160 (for reasons such as because media receiver 550 is not configured to connect to network 160 or a subscriber does not desire or cannot connect to network 160). As such, the connection between network 160 and media receiver 550 is represented by a dotted line. Via such a secondary communication channel, bidirectional exchange of data may occur. As such, data may be transmitted to television service provider system 510 from media receiver 550 via network 160. Data may also be transmitted from television service provider system 510 to media receiver 550 via network 160. Network 160 may be the Internet. While audio and video services may be provided to media receiver 550 via satellites 530, feedback from media receiver 550 to television service provider system 510 may be transmitted via network 160.

Figure 6:
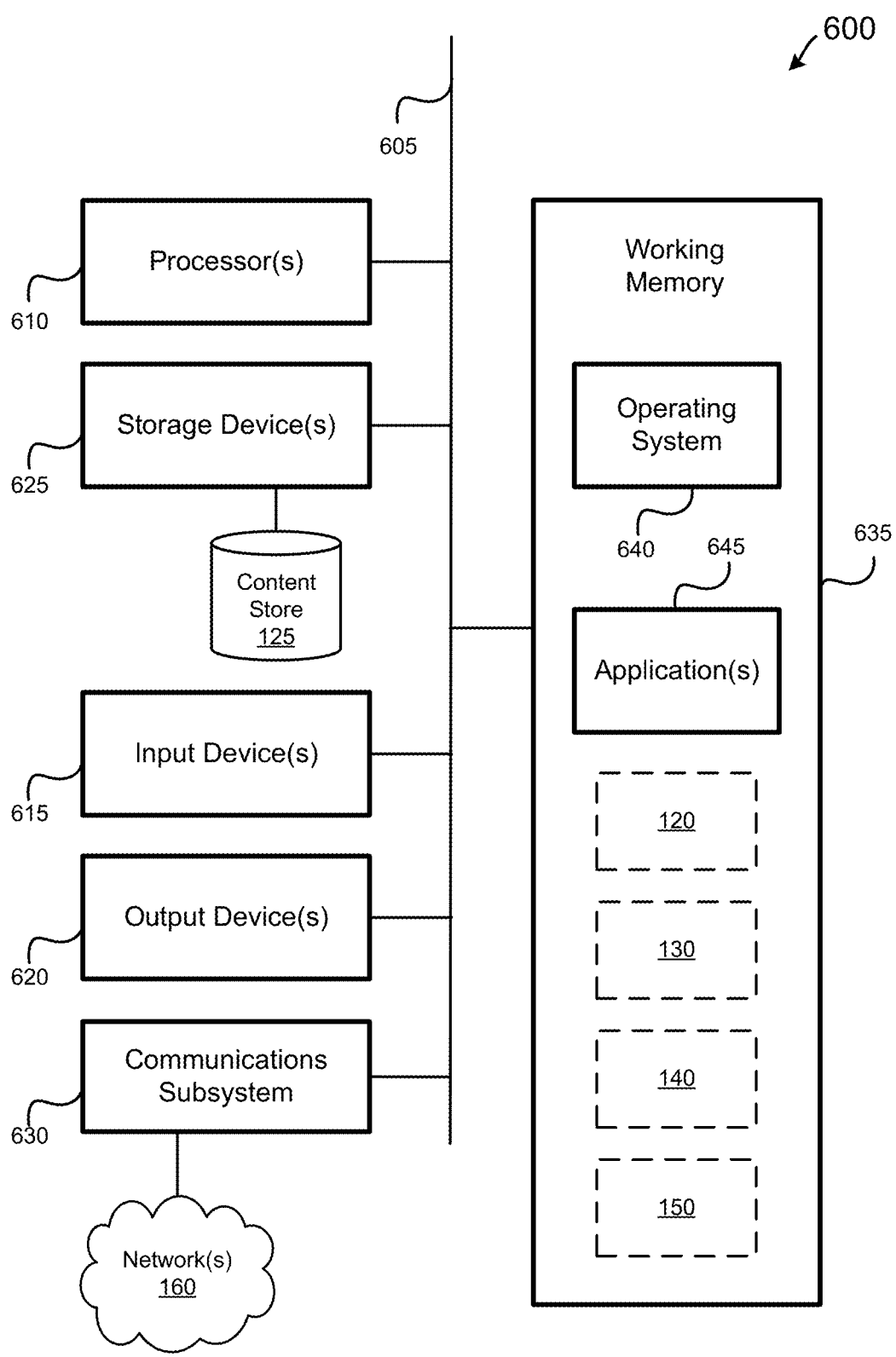
FIG. 6 provides a schematic illustration of one embodiment of a computer system that can perform various steps of the methods provided by various embodiments.

A computer system as illustrated in FIG. 6 may be incorporated as part of the previously described computerized devices, such as the media playback devices 110, or components of the media playback devices 110. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like); one or more input devices 615, which can include, without limitation, a mouse, a keyboard, remote control, touchscreen interface, audio interface (e.g., microphone), video interface (e.g., camera), sensor interface, and/or the like; and one or more output devices 620, which can include, without limitation, a display device, a printer, a speaker, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the non-transitory storage devices 625 include the content data store 155.

The computer system 600 can also include a communications subsystem 630, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 630 may permit data to be exchanged with a network (such as the one or more networks 160, to name one example), other computer systems, and/or any other devices described herein. In many embodiments, the computer system 600 will further comprise a working memory 635, which can include a RAM or ROM device, as described above.

The computer system 600 also can comprise software elements, shown as currently being located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code. In some embodiments, the executable code, when executed, implements the playback subsystem 120, MPI embedder 130, MPI handler 140, and/or network interface 150.

In some embodiments, the computer system 600 implements a system for providing embeddable media playback interactions, according to some embodiments. The system 600 includes one or more of the processors 610, and a memory (e.g., working memory 635) communicatively coupled with, and readable by, the one or more processors 610 and having stored therein processor-readable instructions. When the instructions are executed by the one or more processors 610, they can cause the one or more processors 610 to: output a media content file for playback in a first timeframe to a first user via an interactive media playback interface; receive a set of media playback interactions from the first user via the interactive media playback interface during the playback of the media content file, the set of media playback interactions affecting playback presentation of the media content file; and generate EMPI data to logically associate the set of media playback interactions with the media content file. As described herein, the EMPIs are generated, such that subsequent outputting of enhanced media content that embeds the EMPI data with the media content file provides user-responsive playback of the set of media playback interactions to affect playback presentation of the media content file during the subsequent outputting.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

Figure 7:
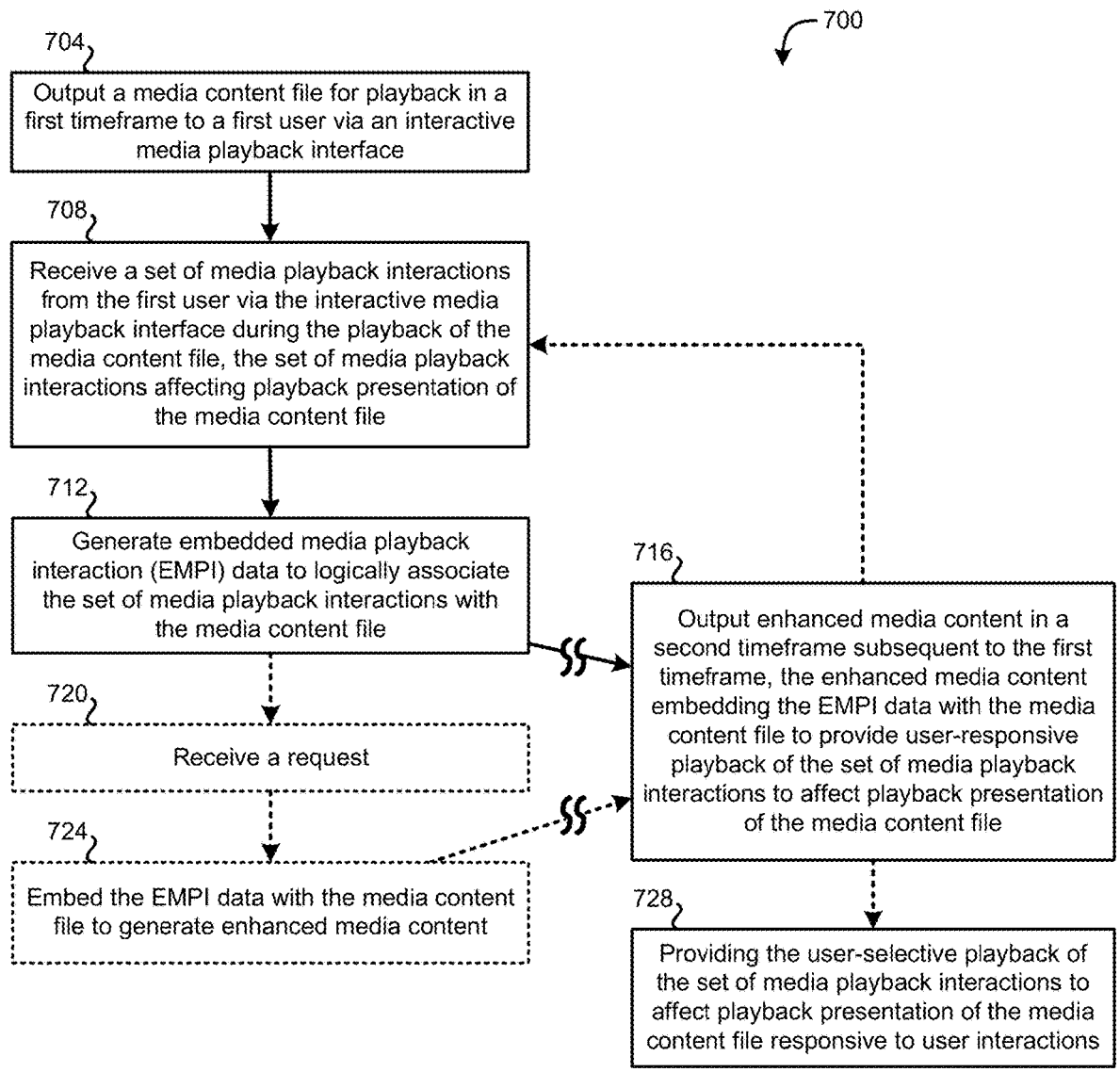
FIG. 7 shows a flow diagram of an illustrative method for providing and handling embeddable media playback interactions, according to various embodiments.

Systems including those described above can be used to implement various methods. FIG. 7 shows a flow diagram of an illustrative method 700 for providing and handling embeddable media playback interactions, according to various embodiments. Embodiments of the method 700 begin at stage 704 by first outputting a media content file for playback in a first timeframe to a first user via an interactive media playback interface. At stage 708, embodiments can receive a set of media playback interactions from the first user via the interactive media playback interface during the playback of the media content file, the set of media playback interactions affecting playback presentation of the media content file. In some cases, the set of media playback interactions affects playback presentation of a still image of the media content file (e.g., a photograph, manipulable media, etc.). In other cases, the set of media playback interactions comprises a sequence of media playback interactions affecting playback presentation of a portion of video data of the media content file (e.g., a full-length movie, an episode of a television program, a user-generated video, a video log, etc.).

At stage 712, embodiments can generate embedded media playback interaction (EMPI) data (or EMPIs) to logically associate the set of media playback interactions with the media content file. In some embodiments, the generating at stage 712 includes generating a set of interaction data corresponding to the set of media playback interactions, and generating a set of embedding data to associate the set of media playback interactions with respective media components of the media content file. At stage 716, embodiments can second output enhanced media content in a second timeframe subsequent to the first timeframe, the enhanced media content embedding the EMPI data with the media content file to provide user-responsive playback of the set of media playback interactions to affect playback presentation of the media content file during the second outputting. In some cases, stage 716 can be performed by a different system and/or user than sages 704-712. Further, in some implementations, during or subsequent to the outputting at stage 716, additional media playback interactions can be received, embedded, etc. in accordance with further iterations of one or more stages of the method 700.

In some embodiments, a request can be received at stage 720, and the EMPI data can be embedded with the media content file at stage 724 to generate the enhanced media content responsive to receiving the request at stage 720 and prior to the second outputting at stage 716. In some such embodiments, the request at stage 720 is to access the EMPI data subsequent to generating the EMPI data at stage 712, and the embedding at stage 724 is in preparation for the outputting at stage 716. In other such embodiments, the request at stage 720 is from the first user to share the EMPI data, and the embedding at stage 724 can be in preparation for sharing (e.g., for communicating, for storing to a shared access location, etc.). For example, the first user requests to share the EMPI data with a second user, the enhanced media content is generated, and the enhanced media content is communicated to a shared access location, a social media site, a second user, etc.

In some embodiments, generating the EMPI data at stage 712 includes storing the set of interaction data and the set of embedding data as an EMPI file separate from the media content file, the set embedding data defining one or more logical linkages from the EMPI file to the media content file. In some such embodiments, the outputting at stage 716 includes concurrently playing back the media content file and executing the EMPI file, and providing the user-responsive playback of the set of media playback interactions by adapting the concurrent paying back in accordance with the one or more logical linkages and with user interactions received during the second outputting. In other embodiments, generating the EMPI data at stage 712 includes storing the set of interaction data as an EMPI file, and embedding the set of embedding data into the media content file to generate a modified media content file, the set embedding data defining one or more logical linkages from the media content file to the EMPI file. In some such embodiments, the outputting at stage 716 includes playing back the media content file and providing the user-responsive playback of the set of media playback interactions by accessing portions of the EMPI file in accordance with the one or more logical linkages during the playing back of the media content file. In other embodiments, generating the EMPI data at stage 712 includes embedding the set of interaction data and the set of embedding data into the media content file to generate the enhanced media content as an enhanced media content file. In some such embodiments, the outputting at stage 716 includes outputting the enhanced media content file.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing embeddable media playback interactions, the method comprising:
   first outputting a media content file for first playback in a first timeframe to a first user via an interactive media playback interface;
   receiving a set of media playback interactions from the first user via the interactive media playback interface during the first playback of the media content file, the set of media playback interactions affecting playback presentation of the media content file;
   generating embedded media playback interaction (EMPI) data to logically associate the set of media playback interactions with the media content file, such that the subsequent playback of the media content file provides for selective playback of the EMPI data during the subsequent playback of the media content file;
   receiving a user request for second playback of the media content file in a second timeframe subsequent to the first timeframe, the user request indicating whether to playback the media content file with enhanced media affecting playback presentation of the media content file;
   playing back the media content file responsive to the user request, such that:
   responsive to the user request indicating not to playback the media content file with the enhanced media, the playing back comprises playing back the media content file without the EMPI data so that the set of media playback interactions does not affect the playback presentation of the media content file; and responsive to the user request indicating to playback the media content file with the enhanced media, the playing back comprises playing back the media content file with the EMPI data so that the set of media playback interactions affects the playback presentation of the media content file.

2. The method of claim 1, further comprising:
receiving a request to access the EMPI data subsequent to generating the EMPI data; and
embedding the EMPI data with the media content file to generate the enhanced media responsive to receiving the request and prior to the second outputting.

3. The method of claim 1, further comprising:
receiving a request from the first user to share the EMPI data with a second user;
embedding the EMPI data with the media content file to generate the enhanced media responsive to receiving the request; and
communicating the enhanced media to the second user for playback according to the second outputting.

4. The method of claim 1, wherein generating the EMPI data comprises:
generating a set of interaction data corresponding to the set of media playback interactions; and
generating a set of embedding data to associate the set of media playback interactions with respective media components of the media content file.

5. The method of claim 4, wherein:
generating the EMPI data further comprises storing the set of interaction data and the set of embedding data as an EMPI file separate from the media content file, the set embedding data defining one or more logical linkages from the EMPI file to the media content file; and
the second outputting comprises concurrently playing back the media content file and executing the EMPI file, and providing the playback of the set of media playback interactions by adapting the concurrent paying back in accordance with the one or more logical linkages and with user interactions received during the second outputting.

6. The method of claim 4, wherein:
generating the EMPI data further comprises:
storing the set of interaction data as an EMPI file; and
embedding the set of embedding data into the media content file to generate a modified media content file, the set embedding data defining one or more logical linkages from the media content file to the EMPI file; and
the second outputting comprises playing back the media content file and providing the playback of the set of media playback interactions by accessing portions of the EMPI file in accordance with the one or more logical linkages during the playing back of the media content file.

7. The method of claim 4, wherein:
generating the EMPI data further comprises:
embedding the set of interaction data and the set of embedding data into the media content file to generate the enhanced media as an enhanced media content file; and
the second outputting comprises outputting the enhanced media content file.

8. The method of claim 1, wherein the second outputting comprises:
displaying one or more graphical user interface elements in association with the playback in the second timeframe, the playback of the set of media playback interactions controllable via the one or more graphical user interface elements.

9. The method of claim 8, wherein the second outputting comprises:
detecting user interaction with one of the one or more graphical user interface elements during the playing back the media content file without the EMPI data; and
applying at least one of the set of media playback interactions to affect the playback of the media content file responsive to, and in accordance with, the detecting.

10. The method of claim 1, wherein the set of media playback interactions affects playback presentation of a still image of the media content file.

11. The method of claim 1, wherein the set of media playback interactions comprises a sequence of media playback interactions affecting playback presentation of a portion of video data of the media content file.

12. A media playback device for providing embeddable media playback interactions, the media playback device comprising:
a playback subsystem, having an interactive media playback interface, to:
first output a media content file for first playback in a first timeframe to a first user via an interactive media playback interface; and
receive a set of media playback interactions from the first user via the interactive media playback interface during the first playback of the media content file, the set of media playback interactions affecting playback presentation of the media content file; and
a media playback interaction embedder coupled with the playback subsystem to generate embedded media playback interaction (EMPI) data to logically associate the set of media playback interactions with the media content file,
such that subsequent outputting of enhanced media content that embeds the EMPI data with the media content file provides user-responsive playback of the set of media playback interactions to affect playback presentation of the media content file during the subsequent outputting,
wherein the playback subsystem is further to:
receive a user request for playback of the media content file in a second timeframe subsequent to the first timeframe, the user request indicating whether to playback the media content file with enhanced media affecting playback presentation of the media content file;
playing back the media content file responsive to the user request, such that:
responsive to the user request indicating not to playback the media content file with the enhanced media, the playing back comprises playing back the media content file without the EMPI data so that the set of media playback interactions does not affect the playback presentation of the media content file; and
responsive to the user request indicating to playback the media content file with the enhanced media, the playing back comprises playing back the media content file with the EMPI data so that the set of media playback interactions affects the playback presentation of the media content file.

13. The media playback device of claim 12, wherein:
the playback subsystem is further to receive a request from the first user to share the EMPI data with a second user;

the media playback interaction embedder is further to embed the EMPI data with the media content file to generate the enhanced media content responsive to receiving the request; and communicating the enhanced media content to the second user for playback according to the second outputting.

14. The media playback device of claim 13, further comprising:

a communications subsystem configured to communicate the enhanced media content to the second user for playback responsive to the request from the first user.

15. The media playback device of claim 12, further comprising:

a media playback interaction handler coupled with the playback subsystem to provide the user-responsive playback of the set of media playback interactions to affect the playback presentation of the media content file during the subsequent outputting.

16. The media playback device of claim 15, wherein:

the playback subsystem is further to receive a request to access the EMPI data subsequent to generating the EMPI data; and the media playback interaction handler is further to embed the EMPI data with the media content file to generate the enhanced media content responsive to receiving the request and prior to the subsequent outputting.

17. The media playback device of claim 12, wherein the media playback interaction embedder is configured to generate the EMPI data by:

generating a set of interaction data corresponding to the set of media playback interactions; and generating a set of embedding data to associate the set of media playback interactions with respective media components of the media content file.

18. The media playback device of claim 17, wherein:

the media playback interaction embedder is configured to generate the EMPI data further by storing the set of interaction data and the set of embedding data as an EMPI file separate from the media content file, the set embedding data defining one or more logical linkages from the EMPI file to the media content file, such that the subsequent outputting comprises concurrently playing back the media content file and executing the EMPI file, and providing the user-responsive playback of the set of media playback interactions by adapting the concurrent playing back in accordance with the one or more logical linkages and with user interactions received during the subsequent outputting.

19. The media playback device of claim 17, wherein:

the media playback interaction embedder is configured to generate the EMPI data further by:

storing the set of interaction data as an EMPI file; and embedding the set of embedding data into the media content file to generate a modified media content, the set embedding data defining one or more logical linkages from the media content file to the EMPI file, such that the subsequent outputting comprises playing back the media content file and providing the user-responsive playback of the set of media playback interactions by accessing portions of the EMPI file in accordance with the one or more logical linkages during the playing back of the media content file.

20. The media playback device of claim 17, wherein:

the media playback interaction embedder is configured to generate the EMPI data further by embedding the set of interaction data and the set of embedding data into the media content file to generate the enhanced media content as an enhanced media content file, such that the subsequent outputting comprises obtaining and outputting the enhanced media content file.

* * * * *